Feb. 6, 1968 F. R. McNICOL 3,368,200
SIGNAL SWITCHING APPARATUS WITH INTERLOCK CIRCUITRY
Filed Feb. 26, 1964
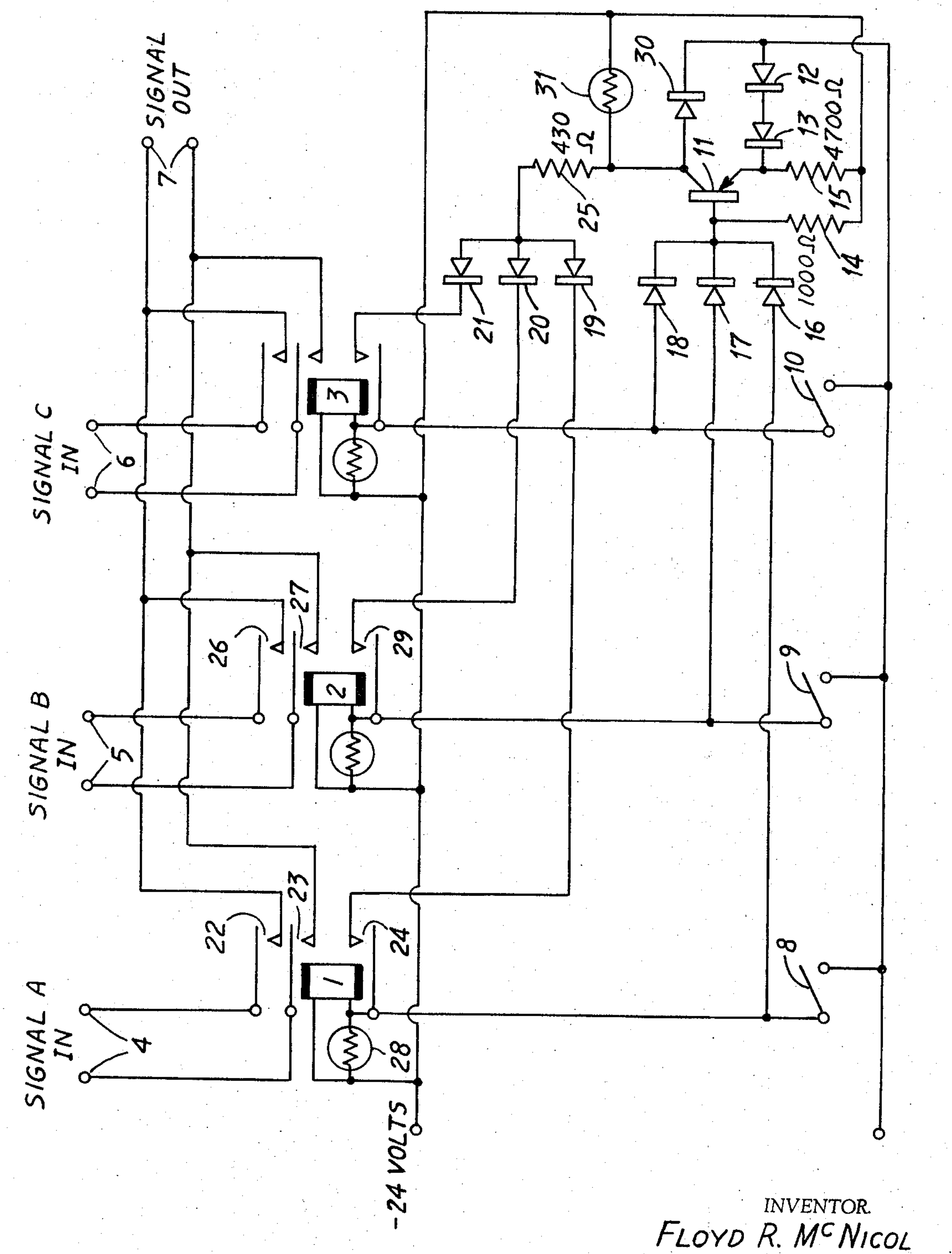
INVENTOR.
FLOYD R. McNICOL
BY
W. H. Sprague
ATTORNEY

United States Patent Office 3,368,200
Patented Feb. 6, 1968

3,368,200
SIGNAL SWITCHING APPARATUS WITH INTERLOCK CIRCUITRY

Floyd R. McNicol, Moorestown, N.J., assignor to Radio Corporation of America, a corporation of Delaware

Filed Feb. 26, 1964, Ser. No. 347,487
9 Claims. (Cl. 340—147)

This invention relates to switching apparatus and particularly to a fast acting circuit arrangement whereby any single one of a plurality of signals may be selectively connected to a common output circuit.

There are numerous needs for connecting any selected signal source to a single output circuit in such a manner that, when a particular signal source is connected to the output circuit, it remains latched or locked in this connection until another signal source is selected for such connection. In such a situation it is often desirable that the first signal source be disconnected from the output circuit in the shortest possible time so that its connection does not overlap in time the connection of the second signal source to the output circuit. One application of such switching apparatus is for selectively switching between different ones of a plurality of audio signal sources and/or video signal sources in radio and/or television studios. Apparatus presently in use effects the desired switching by means of apparatus elements such as relays which are operated in response to a "pull-in" voltage applied from a control signal source by the manipulation of selector switches. Such relays have, not only the contacts for effecting the desired connections of the signal sources to the output circuit, but also contacts and circuit connections to a "holding" voltage source and by which any given relay upon activation becomes locked or latched in its operated state independently of the selector switch by which it was initially operated. Also, these circuits have been interconnected with holding and releasing apparatus in the form of additional relays and their associated contacts so that the operation of a given switching relay effects the release of any previously operated relay.

While for most applications such apparatus has performed satisfactorily, the use of the holding and releasing auxiliary relays inherently limits the speed of operation of the switching apparatus. Special precautions have therefore been used in order to ensure that the previously operated relay has been released so as to disconnect its associated signal source from the output circuit before a new signal source is connected to the output circuit. Such operation (called "gap switching" for convenience) ensures that no signal mutilization or distortion takes place by virtue of the concurrent impression upon the output circuit of more than one set of signals. Furthermore, it is desirable to minimize the time elapsing between disconnection of one signal source from, and the connection of a second signal source to, the output circuit so as to make as imperceptible as possible any interruption in the signals applied to the output circuit.

It, therefore, is an object of the present invention to provide holding and releasing apparatus for use in conjunction with signal switching apparatus by which to establish (a) a faster release of an operated switching apparatus element and (b) a faster reestablishment of the holding voltage when the "pull-in" voltage from the control signal source is disconnected, thereby to achieve "gap switching" between two or more signal sources.

Such a facility is provided in an illustrative embodiment of the invention by the replacement of the previously used holding and releasing relays with a novel circuit arrangement of a solid state device such as a control transistor and a plurality of associated circuit elements such as diodes and resistors. During operation of any one switching relay the transistor is in a current conducting state so as to produce a holding voltage at an output electrode for application to the locking or latching circuit of the operated relay. When another selector switch is operated, the circuit through the associated selected relay is closed to apply a "pull-in" voltage and thereby energize the relay for operation. At the same time the transistor is biased so as to substantially immediately become nonconducting; thereby removing the locking voltage at its output terminal to release the previously operated relay. By the novel use of the transistor and its associated circuitry the locking voltage is removed from the holding circuit in a much shorter time than has heretofore been possible with the use of the holding and releasing electromechanical relays. When the energizing selector switch is released, the holding voltage is immediately re-established since the transistor is no longer biased off. This immediate re-establishment of holding voltage minimizes timing problems which were troublesome when holding voltage was re-established by relay operation as in some prior art devices.

For a more complete description of an illustrative embodiment of the present invention and of its mode of operation, reference will be made to the accompanying drawing, the single figure of which is a schematic circuit diagram of a plurality of switching relays together with the holding and releasing circuitry embodying the present invention.

In the drawing there is shown a plurality of switching relays 1, 2 and 3 each having contacts which when closed are capable of effecting the connection of the respective signals A, B and C present at input terminals 4, 5 and 6 respectively with the output signal terminals 7. Each of the relays 1, 2 and 3 is operated by the closure of the respectively associated selector switches 8, 9 and 10. Each relay when operated is held in such state until subsequently released by the selection of another relay for operation by manipulation of the appropriate selector switch under the control of a transistor 11 and its associated circuit elements.

The emitter electrode of the control transistor 11 is connected to the +24 volt bus through two voltages dropping diodes 12 and 13, each of which produce a voltage drop of approximately 0.8 volt when carrying current in the forward direction. The base and emitter electrodes of the transistor are connected respectively by resistors 14 and 15 to the −24 volt bus with the resistors serving as biasing units for the transistor which determine its operating characteristic and dissipation while in a conducting state. The transistor normally is maintained in a conducting state by means of a self-biasing circuit (to be described in detail subsequently) until one of the selector switches 8, 9 or 10 is operated. The selector switches 8, 9 and 10 when individually operated connect the +24 volt bus to the base of the control transistor 11 through corresponding diodes 16, 17 and 18.

The operation of relay 1, for example, is effected when the momentary closure of switch 8 connects the +24 volt bus to one side of the winding of relay 1. Since the −24 volt bus is permanently connected to the other side of the relay winding this relay immediately starts to "pull in." The momentary closure of switch 8 also applies +24 volts to the anode of diode 16 thereby applying +24 volts minus the voltage drop through diode 16 (approximately 0.8 volt) to the base of the transistor 11. With a voltage of +22.4 volts (24 volts minus the drop through diodes 12 and 13 totalling approximately 1.6 volts) permanently applied to the emitter of the transistor, the 23.2 volt impression on the base electrode causes the transistor 11 to be instantly "cut off," thereby removing the holding voltage from the common point of the anodes of locking diodes 19, 20 and 21. This causes the release of any relay which was previously "locked up."

The operation of relay 1 closes signal contacts 22 and 23 thereby to connect the signal A appearing at input terminals 4 to the signal output terminals 7. The operation of this relay also effects the closure of locking contacts 24 which establishes a holding circuit for this relay which may be traced from the +24 volt bus through diodes 12 and 13, the emitter-collector path of control transistor 11 which is conducting following the release of selector switch 8, a voltage dropping resistor 25, the locking diode 19, the locking contacts 24 and the winding of relay 1 to the −24 volt bus.

If now it is desired to disconnect signal A appearing at input terminals 4 from the output terminals 7 and to connect instead signal B appearing at input terminals 5 to the output terminals 7 the operator momentarily closes selector switch 9. This operation connects the +24 volt bus to one side of the winding of relay 2, the other side of which is permanently connected to the −24 volt bus and this relay immediately starts to "pull in." The selector switch closure also applies a positive potential from the +24 volt bus to the anode of diode 17 resulting in the application of approximately 23.2 volts to the base of transistor 11 thus biasing it off as previously described. With the transistor in a nonconducting state the holding voltage applied through diode 19 and locking contacts 24 to the winding of relay 1 is removed, thereby effecting the release of contacts 22, 23 and 24 of relay 1.

With the release of relay 1 and the opening of its signal contacts 22 and 23 signal A appearing at input terminals 4 is disconnected from the output terminals 7. This operation is effected before the signal contacts 26 and 27 of relay 2 are closed as the result of the "pull in" of this relay for the connection of signal B appearing at input terminals 5 to the output signal terminals 7.

The signal contacts 22 and 23 of relay 1 are opened before the contacts 26 and 27 of relay 2 can be closed by reason of (a) the use of a lower holding voltage than that used for operating or "pull in" and (b) the connection of a varistor 28 in parallel with the winding of the relay to serve as a damping circuit component. The varistor is a device which has a relatively low resistance when a high voltage is impressed across it and a relatively high resistance when the impressed voltage is low. Thus, while the winding of relay 1 is energized and a relatively low voltage is impressed upon the varistor, it shunts only a low current around the winding. When the energizing circuit is open, however, the varistor provides a relatively low impedance path for current flow resulting from the relatively high voltage pulse produced across the inductive winding of the relay. Current flow in the relay winding thus is quickly reduced to zero thereby effecting rapid release of the relay and the disconnection of the signal A input terminals 4 from the output signal terminals 7.

As in the previously described case with reference to the operation of relay 1 the closure of locking contacts 29 of relay 2 establishes a circuit through locking diode 20 and resistor 25 to the collector electrode of the control transistor 11 so that, immediately upon release of the selector switch 9, the substantially instantaneous reestablishment of the positive voltage at the transistor collector electrode energizes the locking circuit through the winding of relay 2 before it has a chance to release as a result of the opening of selector switch 9.

The switching relay 3 is provided with circuit connections similar to relays 1 and 2 and is operated, locked and released in the same manner as previously described.

The control transistor 11 is maintained in a current conducting state when a relay is locked, by means of a self-biasing circuit which is effective to maintain a suitable voltage relationship between the base and emitter electrodes. This self-biasing circuit may be traced from the +24 volt bus through diodes 12 and 13, the emitter-collector path of the transistor 11, resistor 25, any one of the locking diodes, such as 19, the appropriate locking contacts, such as 24 of relay 1, the associated releasing diode 16 and resistor 14 to the −24 volt bus. By means of such a voltage divider arrangement the emitter-to-base circuit is forward biased appropriately to maintain the transistor in a conducting state. This forward biasing is sufficient to maintain the transistor in a current conducting state but is such that it may be overcome by the positive reverse biasing voltage impressed upon the base through one of the releasing diodes such as 17 upon the closure of the associated selector switch 9 to render the transistor non-conducting as previously described.

Diode 30 is used to ensure that the collector never goes more positive than +24 v., thus offering protection to the transistor elements from voltage transients introduced when the relay coils are energized or released. Varistor 31 connected between the collector and the −24 bolt bus is likewise an element to minimize spike voltages thus offering protection to the transistor. Resistor 25 serves also as a series protection resistor. It helps to minimize transient voltage spikes and also causes a voltage drop to produce a reduced value of holding voltage as previously described. This reduced voltage tends to reduce the amount of power dissipated as heat in the relay coils while they are held in and also tends to allow the relays to drop out somewhat faster than if they were held at the +24 volt potential.

The control transistor 11 used in one successfully operating embodiment of the invention is type ZN1183A. The various resistors used in this embodiment had values as indicated in the drawing. The varistors such as 28 and 31 were type RP11723–G6 −24 volts manufactured by C. P. Clare. All of the diodes employed in this embodiment were type IN2070. In such a practical embodiment of the invention, the various relays were operated in approximately 5 milliseconds after closure of the associated selector switch and released in approximately 2 milliseconds after the operation of a selector switch associated with an unoperated relay. By use of the described holding and releasing apparatus including the control transistor 11 and the associated diodes and other circuit components, the holding circuit can be interrupted for the release of one relay and reestablished for the locking or latching of another relay in as little a time as one-half millisecond. This time is so much shorter than that required to perform a similar function by the previously used holding and releasing relays that such a timing factor no longer needs to be taken into account in designing self-latching relay circuits of the character described.

It has been found that the relays 1, 2 and 3 may be released in the required short intervals of time by using ordinary resistors for damping purposes instead of the voltage dependent devices such as the varistor 28 associated with relay 1. Also, apparatus embodying the present invention has been successfully operated by using a single zener diode in place of the two series connected diodes 12 and 13. For some applications the zener diode may be preferable to the two diodes illustratively disclosed in the drawing so as to increase the range of operating voltage for rendering the transistor nonconducting. Each of the disclosed diodes 12, 13, 16, 17 and 18, for example, has a voltage drop of approximately 0.8 volt when conducting current in the forward direction. The drop across a zener diode on the other hand is approximately 5 volts which, in some applications, ensures more reliable operation.

The holding and releasing apparatus disclosed herein enables more effective operation of the selective switching equipment than the previously used relay type of holding and releasing apparatus. The desired "gap switching" between signal sources is achieved by the faster removal and subsequent restoration of the holding voltage for the switching relays and because the switching relays operate or "pull in" more slowly than they release especially when a reduced holding voltage is used as in the disclosed circuit arrangement.

What is claimed is:

1. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's swtching contacts, and a plurality of selector switches associated respectively with said relays and operable to selectively connect a source of operating voltage to energize the windings of the associated relays; relay holding and releasing apparatus comprising:
  a transistor having output and control electrodes;
  means to apply a forward biasing voltage to a circuit including said control electrode so as to render said transistor normally conductive of current in a circuit including said output electrode;
  means to apply a reverse biasing voltage to said circuit including said control electrode upon the operation of any one of said selector switches to render said transistor non-conductive of current in said circuit including said output electrode; and
  means connnected between the locking contacts of each of said relays and the output electrode of said transistor constituting said source of locking voltage to maintain energization of the winding of an operated one of said relays during conducting periods of said transistor and to release a previously locked one of said relays during non-conducting periods of said transistor.

2. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relays; relay holding and releasing apparatus comprising:
  a transitsor having base, emitter and collector electrodes;
  means to apply a forward biasing voltage to said emitter electrode so as to render said transistor normally conductive of emitter-collector current;
  means to apply a reverse biasing voltage to said base electrode upon the operation of any one of said selector switches to render said transitsor non-conductive of emitter-collector current; and
  means connected between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor.

3. In an apparatus for selectively switching between a plurality of signal sources and a common utilization circuit, said apparatus comprising a plurality of relays associated respectively with said sources and each having switching contacts closable to connect the associated signal source to said utilization circuit and each also having contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relay; relay holding and releasing apparatus comprising:
  a transistor having base, emitter and collector electrodes;
  first unilaterally conducting means connected in suitable polarity to apply a forward biasing voltage of a given magnitude to said emitter electrode;
  second unilaterally conducting means connected in suitable polarity between each of said selector switches and said base electrode to apply a reverse biasing voltage to said base electrode upon the operation of any one of said selector switches to render said transistor non-conductive of emitter-collector current; and
  third unilaterally conducting means connected in suitable polarity between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor.

4. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relays; relay holding and releasing apparatus comprising:
  a transistor having base, emitter and collector electrodes;
  diode means connected in suitable polarity to apply a forward biasing voltage of a given magnitude to said emitter electrode;
  an unlocking diode connected in suitable polarity between each of said selector switches and said base electrode to apply a reverse biasing voltage to said base electrode upon the operation of any one of said selector switches to render said transistor non-conductive of emitter-collector current; and
  means including a locking diode connected in suitable polarity between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor.

5. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selectoı switches associated respectively with said relays and operable to selectively connect a source of operating voltage to energize the windings of the assocaited relays; relay holding and releasing apparatus comprising:

a transistor having base, emitter and collector electrodes;

means to bias said transistor normally for conduction of emitter-collector current;

diode means connected in suitable polarity to apply a forward biasing voltage of a given magnitude to said emitter electrode;

an unlocking diode connected in suitable polarity between each of said selector switches and said base electrode to apply a reverse biasing voltage to said base electrode upon the operation of any one of said selector switches to render said transistor nonconductive of emitter-collector current; and means including a locking diode connected in suitable polarity between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor.

6. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relays; relay holding and releasing apparatus comprising:

a transistor having base, emitter and collector electrodes;

means to bias said transistor normally for conduction of emitter-collector current;

a pair of diodes connected in series in suitable polarity to apply a forward biasing voltage of a given magnitude to said emitter electrode;

an unlocking diode connected in suitable polarity between each of said selector switches and said base electrode to apply a reverse biasing voltage to said base electrode upon the operation of any one of said selector switches to render said transistor non-conductive of emitter-collector current; and means including a locking diode connected in suitable polarity between the locking contacts of each of said relays and the collector electrode of said transistor constituting said source of locking voltage to maintain energization of the winding of an operated one of said relays during conducting periods of said transistor and to release a previously locked one of of said relays during non-conducting periods of said transistor.

7. In an apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectivity connect a source of operating voltage to energize the windings of the associated relays; relay holding and releasing apparatus comprising:

a PNP type transistor having base, emitter and collector electrodes;

means to bias said transistor normally for conduction of emitter-collector current;

a pair of diodes connected in series in suitable polarity to apply a positive voltage of a given magnitude to said emitter electrode;

a single unlocking diode connected in suitable polarity between each of said selector switches and said base electrode to apply a positive voltage of more than said given magnitude to said base electrode upon the operation of any one of said selector switches to render said transistor non-conductive of emitter-collector current; and means including a locking diode connected in suitable polarity between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor.

8. In apparatus for selectively switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relays; relay holding and releasing apparatus comprising:

a PNP type transistor having base, emitter and collector electrodes;

means to bias said transistor normally for conduction of emitter-collector current;

a pair of diodes connected in series in suitable polarity to apply a positive voltage of a given magnitude to said emitter electrode;

a single unlocking diode connected in suitable polarity between each of said selector switches and said base electrode to apply a positive voltage of more than said given magnitude to said base electrode upon the operation of any one of said selector switches to render said transistor non-conductive of emitter-collector current;

means including a locking diode connected in suitable polarity between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor; and a voltage-dropping resistor connected between said transistor collector electrode and each of said locking diodes to limit said locking voltage to a magnitude less than that of said operating voltage.

9. In apparatus for selectivity switching between a plurality of signal sources and a common utilization circuit, said apparatus comprising a plurality of relays associated respectively with said sources and each having switching contacts closable to connect the associated signal source to said utilization circuit and each also having locking contacts closable to a source of locking voltage to maintain energization of the winding of an operated relay whereby to maintain closure of that operated relay's switching contacts, and a plurality of selector switches associated respectively with said relays and operable to selectively connect a source of operating voltage to energize the windings of the associated relays; relay holding and releasing apparatus comprising:

a PNP type transistor having base, emitter and collector electrodes;

means including a first resistor to bias said transistor normally for conduction of emitter-collector current;

a pair of diodes connected in series in suitable polarity to apply a positive voltage of a given magnitude to said emitter electrode;

a single unlocking diode connected in suitable polarity between each of said selector switches and said base electrode to apply a positive voltage of more than said given magnitude to said base electrode upon the operation of any one of said selector switches to render said transistor non-conductive of emitter-collector current;

means including a locking diode connected in suitable porality between the locking contacts of each of said relays and the collector electrode of said transistor constituting said source of locking voltage to maintain energization of the winding of an operated one of said relays during conducting periods of said transistor and to release a previously locked one of said relays during non-conducting periods of said transistor;

a second resistor connected between said transistor collector electrode and each of said locking diodes to limit said locking voltage to a magnitude less than that of said operating voltage; and a self-biasing circuit for said transistor including said pair of diodes, the conducting emitter-collector path of said transistor, said second resistor, one of said locking diodes, the locking contacts of an operated one of said relays, one of said unlocking diodes and a third resistor connected to the base electrode of said transistor.

References Cited

UNITED STATES PATENTS 2,869,110 1/1959 Wagner ---------- 317—137 XR
3,160,793 12/1964 Colburn et al. -------- 317—137

THOMAS B. HABECKER, *Acting Primary Examiner.*

D. J. YUSKO, *Assistant Examiner.*

UNITED STATES PATENT OFFICE

CERTIFICATE OF CORRECTION

Patent No. 3,368,200 February 6, 1968

Floyd R. McNicol

It is certified that error appears in the above identified patent and that said Letters Patent are hereby corrected as shown below:

Column 4, line 21, for "bolt" read -- volt --; column 6, lines 1 and 2, after "having" insert -- locking --; column 9, line 22, for "porality" read -- polarity --.

Signed and sealed this 15th day of July 1969.

(SEAL)
Attest:

Edward M. Fletcher, Jr.
Attesting Officer

WILLIAM E. SCHUYLER, JR.
Commissioner of Patents